Aug. 4, 1931. L. M. PERKINS 1,817,495
GENERATOR
Filed Nov. 27, 1928
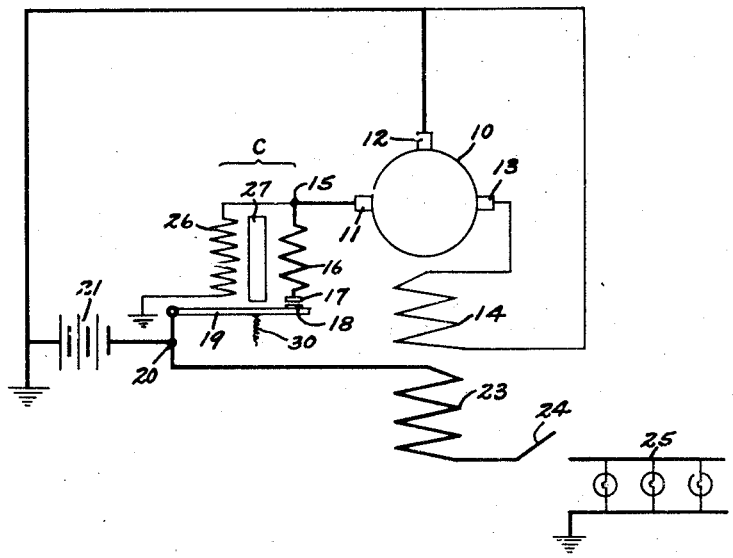
Lawrence M. Perkins Inventor
By Spencer Hardman & Fisher
His Attorneys Patented Aug. 4, 1931

1,817,495

UNITED STATES PATENT OFFICE

LAURENCE MERTON PERKINS, OF ANDERSON, INDIANA, ASSIGNOR TO DELCO-REMY CORPORATION, OF DAYTON, OHIO, A CORPORATION OF DELAWARE

GENERATOR

Application filed November 27, 1928. Serial No. 322,277.

This invention relates to certain improvements in variable speed generators, with special reference to third brush generators.

The object of this invention is to provide means for changing the characteristic curve of the generator with a change in the load.

This is accomplished by providing two sets of windings, one a shunt winding connected to the third brush and one of the main brushes, and the other a series winding placed in series with one part of a parallel load, said series winding being disconnected when the load is reduced, which changes the generator from that of a substantially compound wound generator to that of substantially a shunt wound generator.

Another object is to provide a separately excited generator during the time that the armature rotates at such a low speed that the terminal voltage is below a certain predetermined value. This is accomplished by a relay and a pair of contacts interposed between the generator and the load and series winding, the relay exerting an insufficient force to close the contacts, thus permitting the battery to supply a current through the series windings until the voltage across the main brushes builds up to a predetermined value.

Further objects and advantages of the present invention will be apparent from the following description, reference being had to the accompanying drawing, wherein a preferred embodiment of one form of the present invention is clearly shown.

In the drawing:

The single figure is a schematic diagram of this invention.

The reference character 10 indicates the armature of the generator which is provided with three brushes 11, 12 and 13. Brush 11 is a main brush placed on or near the neutral and brush 12 is another main brush shifted from neutral a distance equal to more than 30 electrical degrees in the direction of rotation of the armature. The third brush 13 is placed on the opposite neutral from the main brush. A shunt field winding 14 is connected in series with the third brush 13 and ground. By this arrangement of the main brushes the generator will generate a substantially uniform voltage over a wide speed range.

Tracing the circuit, the current flows from brush 11 to terminal 15 of the cut-out C, where it divides, a small portion flowing through the high resistance coil 26 to ground. The purpose of coil 26 will be described later. The remainder of the current flows through coil 16 through contacts 17 and 18, to armature 19 to connection or battery terminal 20, where it will divide if switch 24 is closed, some of it flowing through battery 21 to ground, the remainder flowing through the series field 23, through switch 24, through the lighting system 25 on to ground. From this circuit diagram it is clear that when the lighting switch 24 is closed, the generator operates as a cumulative compound wound generator, while when the switch 24 is open it operates as a shunt wound generator charging the battery. This arrangement of the field windings of the generator provides for an increase of current whenever the lighting switch 24 is closed, thereby increasing the output of the generator so that it will simultaneously charge the battery 21 and furnish a current to the lighting system 25.

The cutout C which comprises the two coils 16 and 26 which are wound upon a common core 27 in such a manner that the flux set up by each of the coils is cumulative or additive as long as the battery is being charged, and compensating or opposing as soon as the current through coil 16 is reversed due to a discharge of the battery through the generator. As soon as the current is reversed through coil 16, spring 30 overcomes the force of the electromagnet upon armature 19. Tension of this spring may be adjusted by a suitable adjusting device (not shown).

Whenever the switch 24 is closed and terminal voltage of the generator is not high enough to close contacts 17 and 18, the battery will furnish a current to the series field windings 23 and to the lights 25, or any other suitable load. Thus it is seen that the series windings are separately excited until the voltage across the main brushes is high enough to close contacts 17 and 18.

While the form of embodiment of the present invention as herein disclosed, constitutes a preferred form, it is to be understood that other forms might be adopted, all coming within the scope of the claims which follow.

What is claimed is as follows:

1. A variable speed generator comprising a rotary armature, with two main brushes connected to a load, of which one main brush is on neutral, the other main brush is shifted more than 30 electrical degrees off neutral in the direction of rotation of said armature, a third brush on the neutral opposite said first main brush, a shunt field winding connected across the third brush and said other main brush, a series winding connected in series with the load said fields being cumulative and means for disconnecting one of said field windings when reducing the load.

2. A variable speed generator for which the load comprises a battery to be charged and a load connected across the terminals of the main brushes, one of which is on neutral and the other is shifted from neutral in the direction of rotation, a third brush on the neutral opposite the first main brush, a shunt winding across said third brush and said second main brush, a series winding in series with said load and in parallel with said battery circuit, means for disconnecting said series winding, thereby changing the generator from a compound wound generator to a shunt wound generator for charging said battery.

3. A variable speed generator for which the load is connected in parallel to the two main brushes, one of which is on neutral and the other is shifted more than 30 electrical degrees from neutral in the direction of rotation of the armature, a third brush substantially on the neutral opposite the main brush neutral, a shunt field winding connected to the third brush and to the second main brush, a series winding arranged in series with the one of said parallel loads said shunt winding and said series winding being cumulative, a switch opening the circuit through said load in series with said series winding, thereby changing the generator from a compound wound generator to a shunt wound generator.

4. A variable speed generator comprising a rotary armature, two main brushes connected to a load consisting of a battery and of a lamp circuit, one of the main brushes is on neutral and the other main brush is shifted more than 30 electrical degrees from neutral in the direction of rotation of said armature, a third brush on the neutral opposite said first main brush, a shunt winding connected to said second main brush and said third brush, a cut-out connected to said battery terminal and said first main brush, so constructed and arranged as to prevent the discharge of said battery through said armature, a series field winding connected in series with the lamp circuit and said first main brush through said cut-out arranged to set up a flux cumulative to the flux set up by the shunt winding when the lamps are in the circuit and means to disconnect said lamps and said series field to thereby change the generator from a compound wound generator to a shunt wound generator.

5. A variable speed generator comprising a rotary armature, two main brushes connected to a load arranged in parallel, one of said main brushes being placed on neutral, the other being shifted from neutral, a third brush on the neutral opposite the main brush neutral, a shunt winding connected to the third brush and one of the main brushes, a series winding in series with one branch of said parallel load, the flux of said series winding and said shunt winding being cumulative, and means to disconnect said series winding, thereby changing the generator from a compound wound generator to a shunt wound generator.

6. A variable speed generator having a plurality of loads one of which is a battery, comprising in combination, a rotary armature, a pair of main brushes, one placed on neutral and the other shifted from neutral more than 30 electrical degrees in the direction of rotation of the armature, a third brush on the neutral opposite the main brush neutral, a shunt winding connected to the main brush shifted from neutral and the third brush, a series winding connected in series with part of the load and in parallel with the battery, and means for operating said generator as a separately excited generator until the terminal voltage across the terminals of the main brushes attain a predetermined value.

7. A variable speed generator, comprising in combination, a rotary armature, a pair of main brushes of which one is substantially on neutral and the other is shifted from neutral, a third brush substantially on the neutral opposite the main brush neutral, a shunt field winding, a series field winding, said windings being cumulative, means for separately exciting the generator while starting, relay means for automatically changing the generator from a separately excited to a self-excited compound generator, and means for changing the field windings from a compound wound to a shunt wound generator.

In testimony whereof I hereto affix my signature.

LAURENCE MERTON PERKINS.